United States Patent
Schafer et al.

(10) Patent No.: US 6,402,169 B1
(45) Date of Patent: Jun. 11, 2002

(54) STEERING KNUCKLE AND BALL JOINT ASSEMBLY FOR TRACTOR FRONT AXLE

(75) Inventors: Christopher Alan Schafer, Traer; Dennis Aaron Bowman, Cedar Falls, both of IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/662,609

(22) Filed: Sep. 14, 2000

(51) Int. Cl.$^7$ .............................. B62D 7/16; F16C 11/06
(52) U.S. Cl. ......................... 280/93.512; 280/124.136; 403/122
(58) Field of Search ................. 280/93.512, 124.125, 280/124.136, 124.143; 403/122, 131, 135, 132, 344, 289, 290

(56) References Cited

U.S. PATENT DOCUMENTS

| | | | |
|---|---|---|---|
| 4,437,529 A | * | 3/1984 | Fralish ....................... 180/69.2 |
| 4,613,251 A | * | 9/1986 | Bellamy et al. ............. 403/135 |
| 4,761,019 A | * | 8/1988 | Dubensky ............ 280/124.136 |
| 5,366,233 A | * | 11/1994 | Kozyra et al. .............. 280/96.1 |
| 5,380,024 A | * | 1/1995 | Hayami ...................... 280/96.1 |
| 5,931,597 A | | 8/1999 | Urbach |
| 5,941,653 A | * | 8/1999 | Cipriani ....................... 403/344 |
| 6,231,264 B1 | * | 5/2001 | McLaughlin et al. ......... 403/76 |

FOREIGN PATENT DOCUMENTS

| | | | |
|---|---|---|---|
| JP | 10-244954 | * | 9/1998 |
| JP | 11-255141 | * | 9/1999 |

OTHER PUBLICATIONS

OCAP, Steering & Suspension Parts, 2 pages Date unknown.

* cited by examiner

Primary Examiner—J. J. Swann
Assistant Examiner—David R. Dunn

(57) ABSTRACT

A steering knuckle and ball joint assembly for a tractor is provided in which the ball stud has a spherical ball portion and a pair of studs extending oppositely therefrom for attachment to the steering knuckle. The double studded ball stud enables the overall size of the ball studs to be reduced compared to a ball stud having a single stud and still accommodate the loads applied to the ball joint by the dual front wheels. Ball joints are used for both steering tie rods and suspension control arms. The steering knuckle is pan shaped to surround the ball joints on all but the interior side of the knuckle where the steering and suspension arms are connected. This shielding of the ball joints protect the ball joints from dirt and debris, especially from the mud and dirt thrown by the front tires.

7 Claims, 4 Drawing Sheets

US 6,402,169 B1

STEERING KNUCKLE AND BALL JOINT ASSEMBLY FOR TRACTOR FRONT AXLE

BACKGROUND OF THE INVENTION

1. Field of the Invention

The present invention relates to a steering knuckle and ball joint assembly used in a tractor front axle for steering and suspension and in particular to a ball joint employing a double studded ball stud.

2. Description of Related Art

To improve tractor performance, front axle suspension systems are becoming more commonplace. A front suspension provides improved operator comfort, thereby reducing operator fatigue. In addition, the tractor frame is subject to less impact loading during operation. A front suspension axle, however, adds complexity and additional components to the front axle.

To further improve the performance of agricultural tractors, many tractors are provided with front wheel drive. While the front wheels and tires are typically smaller than the rear, by driving both the rear and the front wheels, tractive efficiency is improved. A mechanical front wheel drive requires a front drive axle with considerably more components compared to a front axle without mechanical front wheel drive.

Recent efforts to further improve tractive efficiency have focused on front axles with dual wheels on each side. While the dual front wheels improve tractive efficiency, the addition of a second wheel on each side of the front axle creates a long moment arm between the outboard tire and the turning axis about which the steering knuckle rotates for steering of the tractor. The forces applied to the steering and suspension components when the outboard tire hits an obstacle, such as a stump or bolder, is much greater than with single front tires. The ball joints of the steering system and the suspension system at the steering knuckle are critical components. To maintain the same design but with larger ball joints to accommodate the increased loads results in ball joints that are so large that the geometry of the steering and suspension systems is compromised and interferences with adjacent chassis structures result.

SUMMARY OF THE INVENTION

Accordingly, it is an object of the present invention to provide ball joints at the steering knuckle for the steering and suspension systems that provide the necessary strength for dual front wheel capability without the large size required by merely enlarging current ball joints. The ball joint of the present invention utilizes a ball stud having a spherical ball portion and a pair of studs extending oppositely therefrom for attachment to the steering knuckle. The double studded ball stud enables the overall size of the ball studs to be reduced compared to a ball stud having a single stud.

One stud of the ball stud is press fit into the steering knuckle while the other stud is captured in a cap that is secured to the knuckle by threaded fasteners. The cap clamps to the stud to securely retain the ball stud. Dowels extend through mounting apertures in the cap and into the steering knuckle to increase the shear strength of the attachment beyond that provided solely by the threaded fasteners themselves. The result is a high strength yet relatively compact ball joint design resulting in a joint that does not interfere with the packaging space required for suspension, powertrain and steering components at the front axle.

Preferably, the steering knuckle is pan shaped to surround the ball joints on all but the interior side of the knuckle where the steering and suspension arms are connected. This shielding of the ball joints protect the ball joints from dirt and debris, especially from the mud and dirt thrown by the front tires. The pan shape of the knuckle results from the knuckle having a concave inboard side creating a recess in which the ball joints are placed.

DESCRIPTION OF THE PREFERRED EMBODIMENTS

Figure 1:
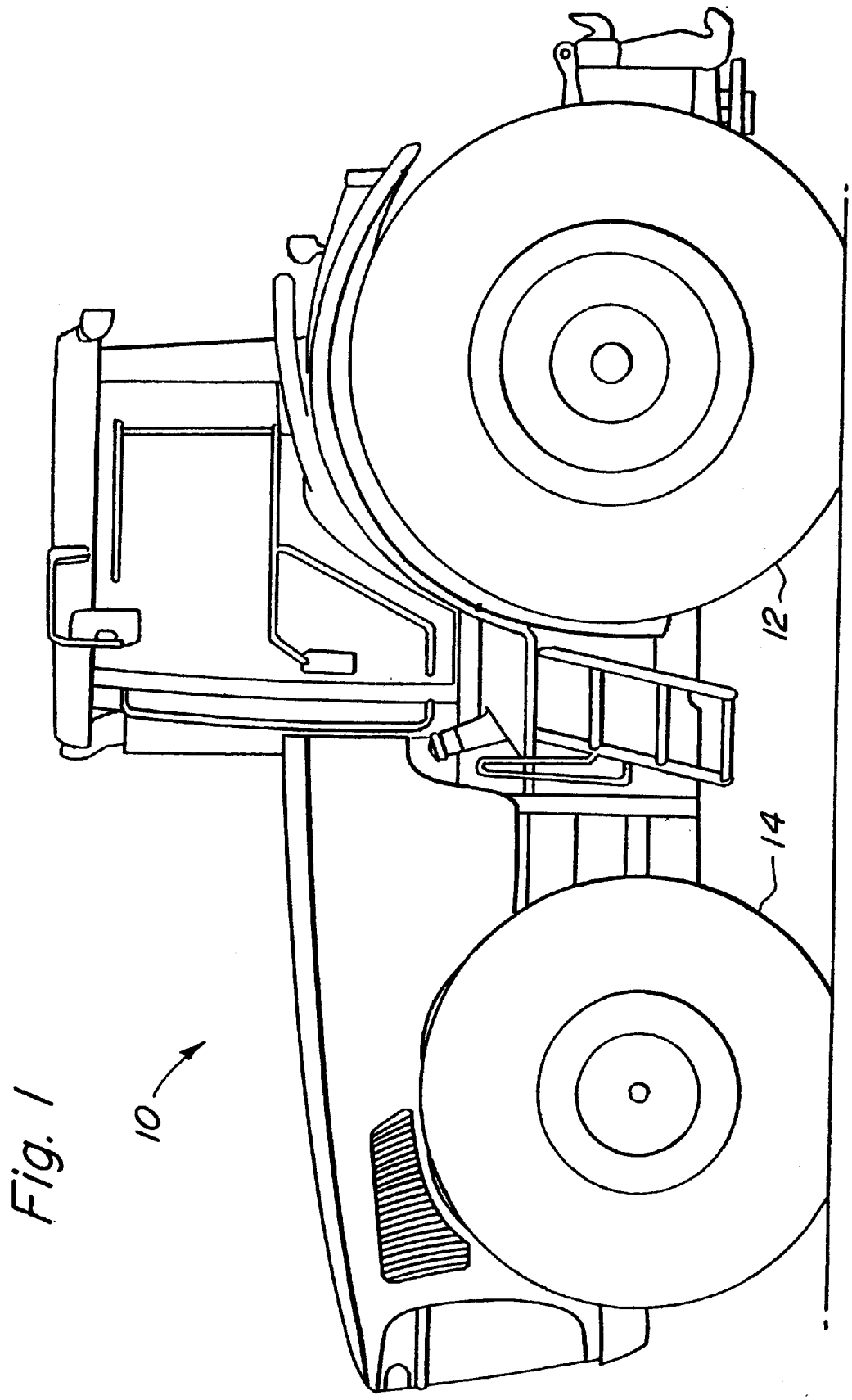
FIG. 1 is a side view of an agricultural tractor having the steering knuckle and ball joints of the present invention.

With reference to FIG. 1, a tractor 10 having the ball joints of the present invention is shown. The tractor 10 includes rear tires 12 and front tires 14. The front tires are steering tires and rotate about upright turning axes to steer the vehicle. Rotation of the wheels 14 about the turning axes is provided through a steering knuckle mounted at each end of the front axle through the ball joints of the present invention.

Figure 2:
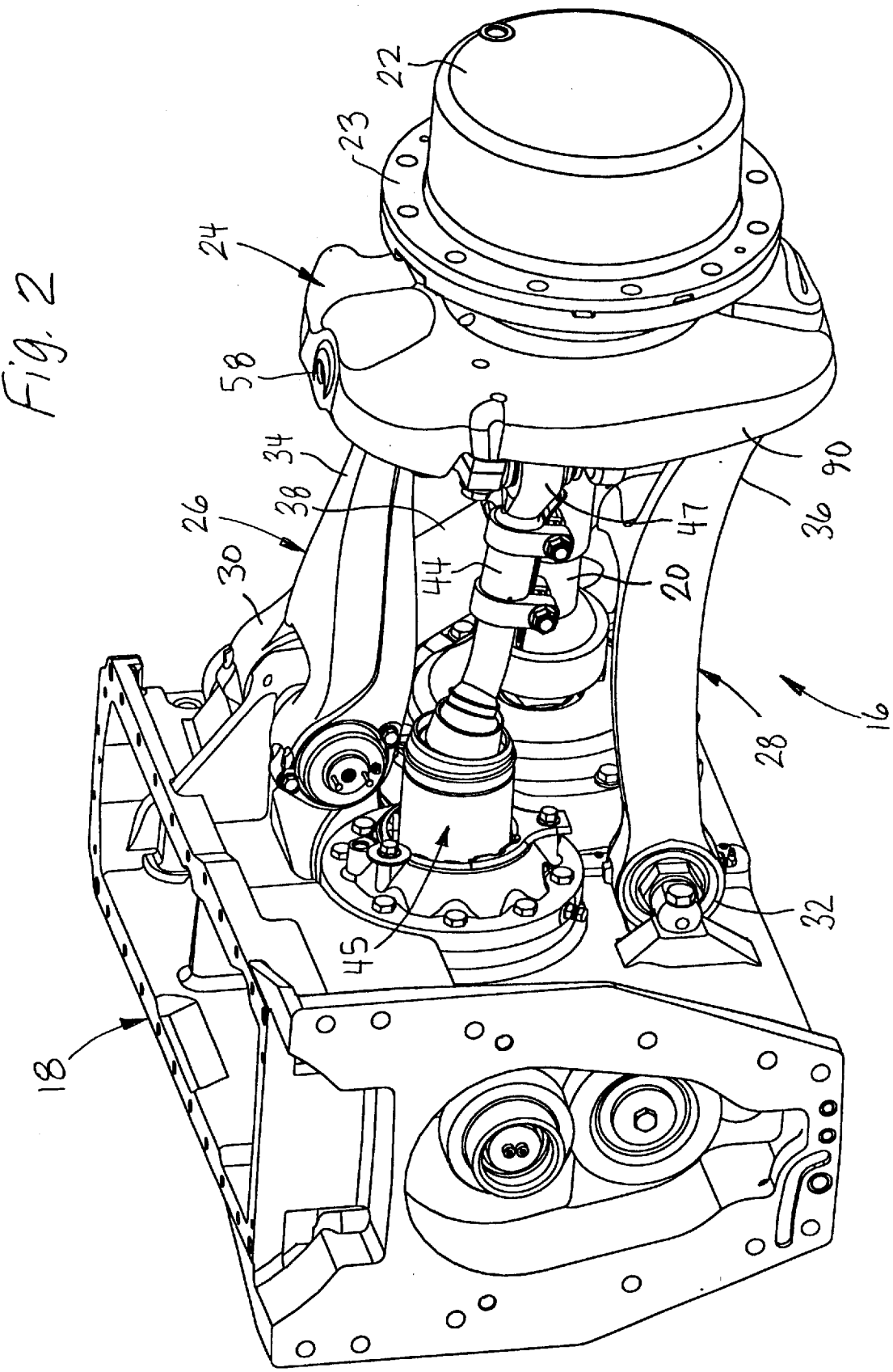
FIG. 2 is a perspective view of the engine and front axle.
Figure 3:
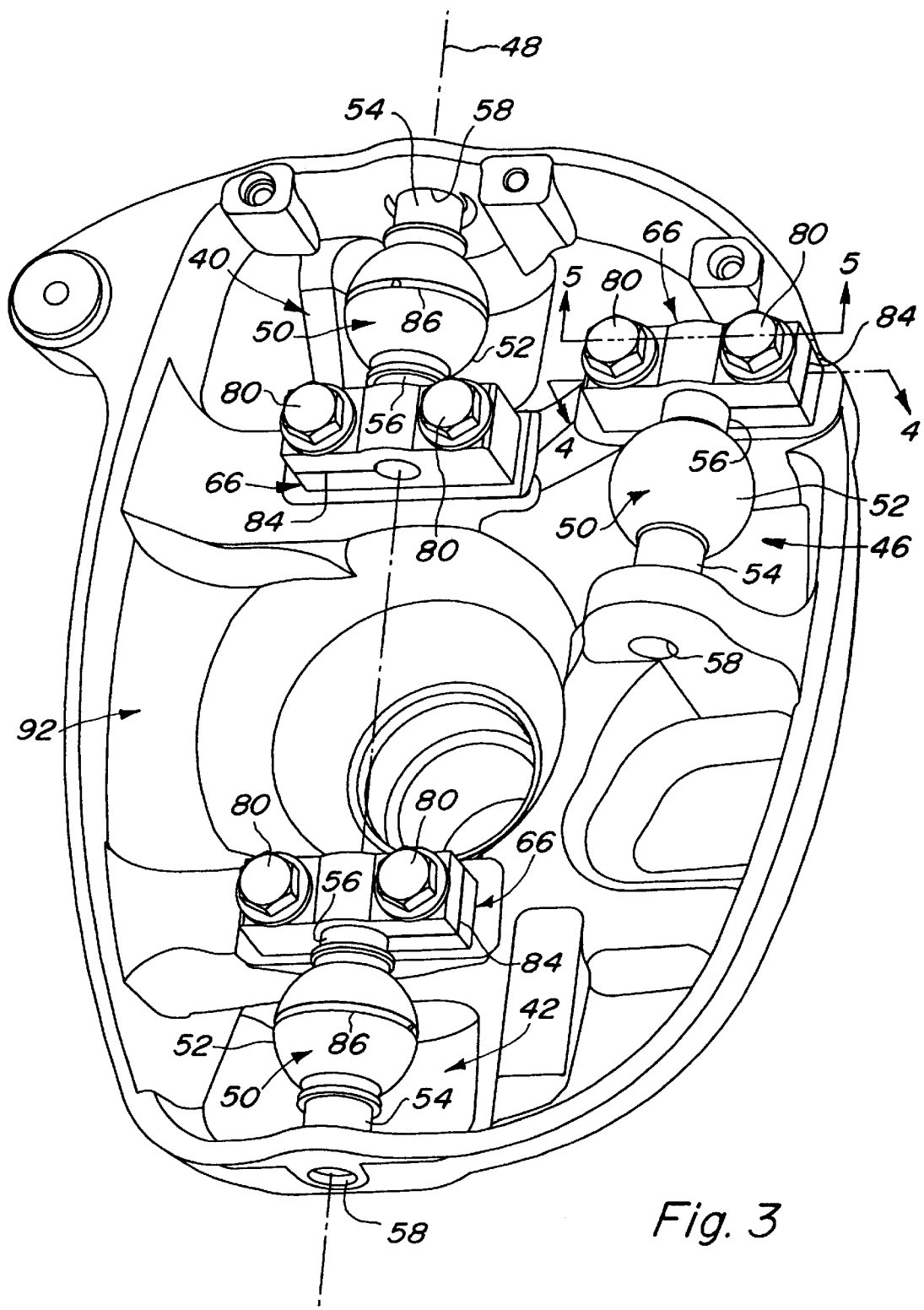
FIG. 3 is a perspective view of the steering knuckle and ball joints of the present invention.
Figure 5:
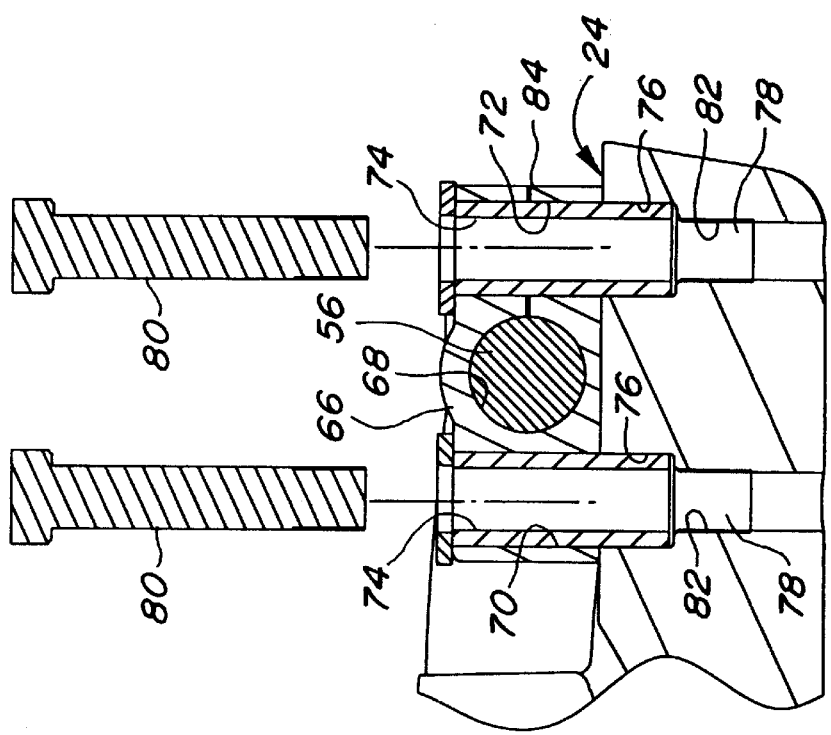
FIG. 5 is a sectional view through the ball joint mounting cap and steering knuckle as seen from the line 5—5 of FIG. 3.
Figure 4:
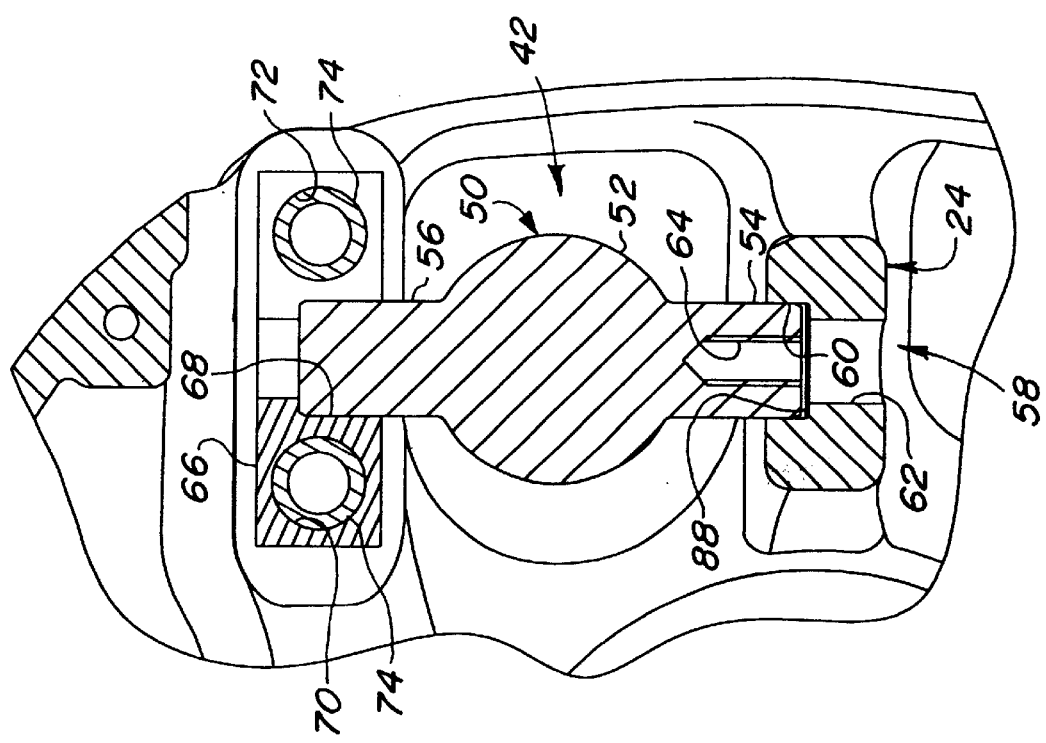
FIG. 4 is a sectional view through the ball joint and steering knuckle as seen from the line 4—4 of FIG. 3.

With reference to FIG. 2, the right hand side of a front axle 16 and suspension is shown in greater detail. The left-hand side is essentially a mirror image of the right hand side although some differences may exist. The mechanical front wheel drive includes a front drive differential case 18 that is part of the tractor frame or attached thereto. A front drive shaft 20 extends to the right from the differential case to provide rotational power to the planetary final drive in the wheel hub 22. A wheel (not shown) is bolted to the flange 23 of the hub. The hub 22 is carried by a steering knuckle 24 that is in turn carried by upper and lower control arms 26, 28 of the suspension. The proximal ends 30, 32 of the upper and lower control arms are pivotally mounted to the differential case 18 whereby the distal ends 34 and 36 can move up and down to raise and lower the front tires 14 relative to the differential case. A hydraulic cylinder 38 extends between the differential case and the lower control arm to support the load of the suspended mass. The cylinder 38 is coupled to a gas accumulator (not shown) to function as a spring. The distal ends 34 and 36 of the upper and lower control arms are coupled to the steering knuckle 24 through upper and lower ball joint assemblies 40, 42 shown in FIG. 3. The ball joint assemblies 40, 42 allow the knuckle to rotate about the turning axis 48.

A steering tie rod 44 extends from a steering cylinder 45 carried by the differential case 18. The distal end 47 of the tie rod 44 is coupled to the steering knuckle through a ball joint assembly 46. The steering ball joint assembly 46 is spaced from the turning axis 48 whereby extension or retraction of the tie rod causes the steering knuckle 24 and hence the tire 14 to rotate about the turning axis 48.

Each ball joint assembly includes a ball stud 50. The ball studs 50 are essentially the same in structure and are preferably of the same dimension, however, different sized ball studs could be used in the three different ball joint assemblies without departing from the scope of the invention. Each ball stud 50 includes a spherical ball portion 52 and a pair of oppositely extending studs 54 and 56. The ball portions of the ball studs used for the upper and lower control arms have lubrication grooves 86 circumscribing the ball portions.

The stud 54 of each ball stud is seated into a bore 58 in the steering knuckle 24. The bores 58 have a first larger portion 60 into which the stud 54 is press fit and a smaller diameter through portion 62 forming shoulders 88 forming stops in each bore for engagement of the studs 54. During initial assembly, the studs 54 are press fit into the larger portions 60 of the bores 58. The studs 54 include an internal threaded bore 64 used during a field service where a press is not available. A threaded member is inserted in the bore 54 and us used to draw the stud 54 into the bore portion 60 of the knuckle.

The stud 56 is secured to the knuckle by a cap 66. The cap 66 includes a first bore 68 receiving the stud 56 of the ball stud. A pair of cross bores 70, 72 extend through the cap on both sides of the bore 68 and at a 90° angle relative to the bore 68. Dowels 74 are disposed in the bores 70 and 74 and extend from the cap and into a large diameter portion 76 of bores 78 in the steering knuckle 74. Threaded fasteners 80 extend through the dowels 74 and are threaded into the smaller diameter portions 82 of the bores 78. The dowels 74 provide greater shear strength to the attachment of the cap to the knuckle than is possible solely with the fasteners 80.

The cap 66 has a slot 84 extending through the cross bore 72 to the bore 68. When the fastener 80 is threaded through the bore 72, the slot 84 is closed, whereby the cap clamps upon the stud 56 to grip the ball stud and prevent rotation of the ball stud.

The control arms and the tie rod include spherical arrangements at their outer ends to surround the ball portions 52 of each of the ball studs in a conventional manner. The ball joints allow the tie rod and control arms to rotate in three degrees of freedom relative to the steering knuckle.

The steering knuckle 24 is pan shaped with a recess on the inboard side formed by sidewalls 90 that extend toward the differential case 18. This creates a recess 92 in which the ball joints are positioned. The walls 90 surround the ball joints on all sides except for the inner side facing the differential case. This shields the ball joints from dirt and mud, particularly that thrown from the front tires.

The ball joint assemblies of the present invention have dual studs for a high strength connection while minimizing the size of the components to provide maximum packaging space for steering, suspension and drive line components of the front axle.

The invention should not be limited to the above-described embodiment, but should be limited solely by the claims that follow.

We claim:

1. A tractor comprising:
    a frame;
    upper and lower control arms mounted to the frame and extending laterally outward for pivotal motion about upper and lower axes respectively for up and down motion of distal ends of the control arms;
    a steering knuckle attached to the distal ends of the control arms through upper and lower ball joints respectively to define a turning axis for the steering knuckle and to allow the knuckle to move up and down relative to the frame;
    a steering tie rod coupled to the steering knuckle through a steering ball joint spaced from the turning axis whereby the tie rod can apply a steering force to the knuckle to rotate the knuckle about the turning axis; and
    the upper, lower and steering ball joints each having a ball stud with a spherical ball portion and a pair of oppositely extending studs fixed to the steering knuckle, with one stud of each ball stud is press fit into a corresponding aperture in the steering knuckle while the other stud of each ball stud is fixed to- the knuckle through a cap fixed to the steering knuckle, the cap including a bore receiving the other stud of the ball stud and a pair of apertures with threaded fasteners extending there through and into the steering knuckle for fixing the cap to the steering knuckle.

2. The tractor as defined by claim 1 wherein the cap includes a slot extending through one fastener aperture and to the stud bore wherein the stud bore clamps on the other stud to prevent rotation of the ball stud relative to the steering knuckle.

3. The tractor as defined by claim 2 further comprising a dowel within the fastener bores in the cap and extending into the steering knuckle.

4. The tractor as defined by claim 1 wherein the steering knuckle has a concave inboard side forming a recess into which the ball studs of the upper, lower and steering ball joints are disposed.

5. A tractor comprising:
    a frame;
    upper and lower control arms mounted to the frame and extending laterally outward for pivotal motion about upper and lower axes respectively for up and down motion of distal ends of the control arms;
    a steering knuckle attached to the distal ends of the control arms through upper and lower ball joints respectively to define a turning axis for the steering knuckle and to allow the knuckle to move up and down relative to the frame;
    a steering tie rod coupled to the steering knuckle through a steering ball joint spaced from the turning axis whereby the tie rod can apply a steering force to the knuckle to rotate the knuckle about the turning axis; and
    the upper, lower and steering ball joints each having a ball stud with at least one ball stud having spherical ball portion and a pair of oppositely extending studs both fixed to the steering knuckle with one stud of the at least one ball stud press fit into an aperture in the steering knuckle wherein the ball stud is rigidly secured to the steering knuckle and one of the upper and lower control arms and steering tie rod is rotatably secured to the ball portion of the ball stud and wherein the other stud of the at least one ball stud is clamped to the knuckle through a cap fixed to the steering knuckle.

6. The tractor as defined by claim 5 wherein the cap includes a slot extending through one fastener aperture and to the stud bore wherein the stud bore clamps on the other stud to prevent rotation of the ball stud relative to the steering knuckle.

7. The tractor as defined by claim 6 further comprising a dowel within the fastener bores in the cap and extending into the steering knuckle.

* * * * *